United States Patent
Viquez Calderon et al.

(10) Patent No.: US 10,484,304 B2
(45) Date of Patent: Nov. 19, 2019

(54) DETERMINING ACTIONS TO BE IMMEDIATELY PERFORMED ON A NETWORK PACKET WITH AN APPLICATION SPECIFIC INTEGRATED CIRCUIT

(71) Applicant: Hewlett Packard Enterprise Development LP, Houston, TX (US)

(72) Inventors: Claudio Enrique Viquez Calderon, Heredia (CR); Thomas A. Keaveny, Auburn, CA (US); Osvaldo Andres Sanchez Melendez, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/577,334

(22) PCT Filed: May 29, 2015

(86) PCT No.: PCT/US2015/033124
§ 371 (c)(1),
(2) Date: Nov. 27, 2017

(87) PCT Pub. No.: WO2016/195621
PCT Pub. Date: Dec. 8, 2016

(65) Prior Publication Data
US 2019/0020599 A1    Jan. 17, 2019

(51) Int. Cl.
*H04L 12/947* (2013.01)
*H04L 12/721* (2013.01)
(Continued)

(52) U.S. Cl.
CPC .............. *H04L 49/25* (2013.01); *H04L 45/38* (2013.01); *H04L 45/54* (2013.01); *H04L 45/745* (2013.01);
(Continued)

(58) Field of Classification Search
None
See application file for complete search history.

(56) References Cited

U.S. PATENT DOCUMENTS

| 7,917,729 B2 | 3/2011 | Georgiou et al. |
| 9,736,073 B2 * | 8/2017 | Kuo ...................... H04L 47/122 |

(Continued)

FOREIGN PATENT DOCUMENTS

| CN | 204119267 | 1/2015 |
| CN | 104539743 | 4/2015 |

(Continued)

OTHER PUBLICATIONS

International Preliminary Report on Patentability received for PCT Application No. PCT/US2015/033124, dated Dec. 14, 2017, 11 pages.

(Continued)

*Primary Examiner* — Phirin Sam
*Assistant Examiner* — Faiyazkhan Ghafoerkhan
(74) *Attorney, Agent, or Firm* — Park, Vaughan, Fleming & Dowler LLC (57) ABSTRACT

In some examples, a network switch includes an Application-Specific Integrated Circuit (ASIC), a processing resource, and a memory resource storing machine readable instructions. The instructions are to cause the processing resource to: accumulate an action set for a first packet received by the switch; fetch an action from the action set; determine, with the ASIC, whether the fetched action is to be performed immediately on the first packet; in response to determining that the fetched action is to be performed immediately, generate a second packet from the first packet; and output one of the first and second packets through an output port without further processing of the packet after generation of the second packet.

14 Claims, 8 Drawing Sheets (51) Int. Cl.
*H04L 12/741* (2013.01)
*H04L 12/933* (2013.01)
*H04L 12/931* (2013.01)
*H04L 29/06* (2006.01)
*H04L 12/717* (2013.01)

(52) U.S. Cl.
CPC ........ *H04L 49/1546* (2013.01); *H04L 49/355* (2013.01); *H04L 69/22* (2013.01); *H04L 45/42* (2013.01)

(56) References Cited

U.S. PATENT DOCUMENTS

| | | |
|---|---|---|
| 2013/0058335 A1 | 3/2013 | Koponen et al. |
| 2013/0163427 A1 | 6/2013 | Beliveau et al. |
| 2013/0266007 A1 | 10/2013 | Kumbhare et al. |
| 2014/0003422 A1 | 1/2014 | Mogul et al. |
| 2014/0016482 A1* | 1/2014 | de Silva ................ H04L 43/026 370/250 |
| 2014/0241357 A1* | 8/2014 | Liu ....................... H04L 45/745 370/392 |
| 2014/0328180 A1 | 11/2014 | Kim et al. |
| 2014/0334489 A1* | 11/2014 | Bosshart ................ H04L 47/56 370/392 |

FOREIGN PATENT DOCUMENTS

| | | |
|---|---|---|
| EP | 1654841 | 5/2006 |
| EP | 2803173 | 11/2014 |
| WO | WO-2014/153421 A2 | 9/2014 |
| WO | 20141169470 A1 | 10/2014 |

OTHER PUBLICATIONS

Extended European Search Report and Written Opinion received for EP Application No. 15894402.5, dated Aug. 29, 2018, 12 pages.
International Searching Authority, The International Search Report and the Written Opinion, dated Feb. 25, 2016, 14 Pgs.
Jeffrey C. Mogul et al, Hey, You Darned Counters! Get Off My ASIC!, Issued: Aug. 13, 2012, 6 Pgs.
Stacey Higginbotham, Applied Micro's Cloud Chip is an Arm-based, Switch-Killing Machine, Issued: Jun. 17-18, 2015, 9 Pgs.

* cited by examiner

DETERMINING ACTIONS TO BE IMMEDIATELY PERFORMED ON A NETWORK PACKET WITH AN APPLICATION SPECIFIC INTEGRATED CIRCUIT

BACKGROUND

Computer networks can be used to allow networked devices, such as personal computers, servers, and data storage devices to exchange data. Computer networks often include intermediary datapath devices such as network switches, gateways, and routers, to flow traffic along selected datapaths for routing data between networked devices. Some intermediary datapath devices can process data received by the device by modifying metadata information of the data or by copying the data.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Software-defined networking can allow for the decoupling of traffic routing control decisions from the network's physical infrastructure. For example, in a Software-Defined Network (SDN), such traffic routing control decisions (e.g., which port of a network switch should be used to forward traffic en route to a given destination) can be determined by an entity (e.g., a network controller) that is different from the routing device itself (e.g., the network switch tasked with forwarding the traffic). Certain SDN-capable network switches include of one or more flow tables and a group table, which can perform packet lookups and forwarding, as well as a channel to an external controller. The switch can, for example, communicate with the controller and the controller can manage the switch via an SDN protocol, such as the OpenFlow protocol. Each flow table in the switch can, for example, contain a set of flow entries, and each flow entry can, for example, include match fields, counters, and a set of instructions to apply to matching packets. Certain SDN protocols allow for instructions such as "apply-actions" that instruct controlled network switches to immediately modify or forward packets between tables or to execute multiple actions of the same type (such as forwarding actions). However, network switches that rely on Application Specific Integrated Circuits (ASICs) for routing traffic are currently unable to support such immediate actions.

Certain implementations of the present disclosure are directed to the use of components of a networking ASIC, such as a replication and packet processing functionality in order to address the above issues. For example, in some implementations, a method can include: (1) accumulating from multiple forwarding tables of a network switch, an action set for a first packet received by the switch, wherein the action set includes a set of actions in a pipeline to be performed on the first packet; (2) fetching an action from the action set; (3) determining, with a networking Application-Specific Integrated Circuit (ASIC) in the network switch, whether the fetched action is to be performed immediately on the first packet; (4) in response to determining that the fetched action is to be performed immediately, generating a second packet from the first packet; (5) outputting one of the first and second packets through an output port; and (6) returning the other of the first and second packets for further processing.

Certain implementations of the present disclosure can provide solutions that allow for the execution of immediate action instruction in hardware, which can, in some circumstances, provide better performance than similar virtualized software implementations and can create more flexibility to SDN applications. Certain implementations can, for example: (1) allow for the creation of copies of packets in which each copied packet contains different headers to reach different destinations; (2) use SDN applications to replicate traffic to multiple servers, and/or (3) enable traffic monitoring and tap applications. Other advantages of implementations presented herein will be apparent upon review of the description and figures.

Figure 1:
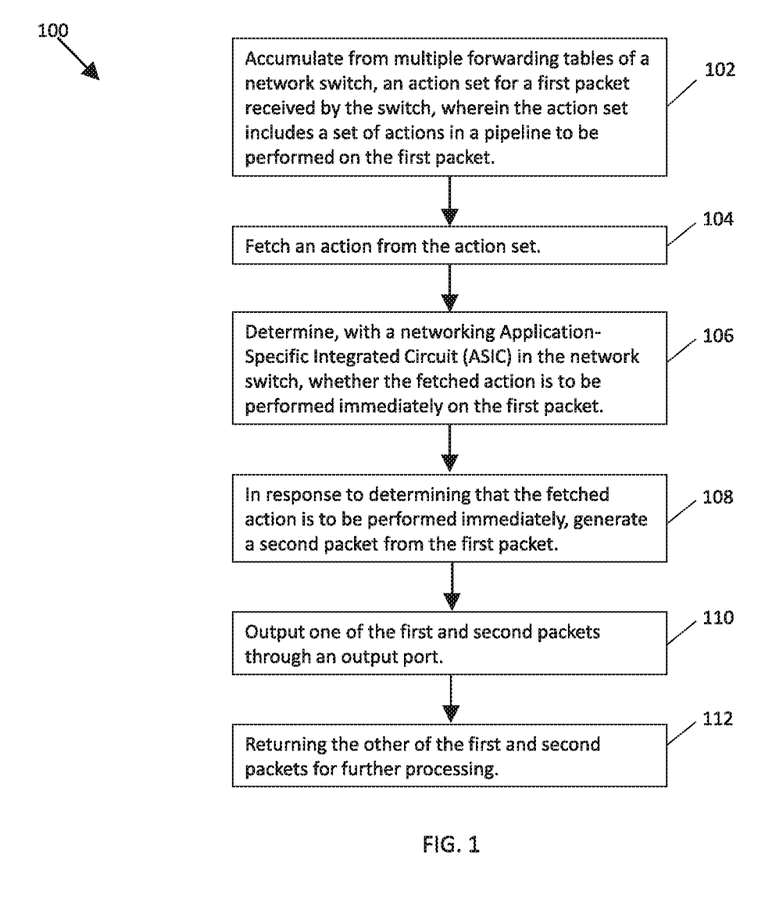
FIG. 1 is a flowchart for a method, according to an example.

FIG. 1 illustrates a flowchart for a method 100 according to an example of the present disclosure. In some implementations, method 100 can be implemented in the form of executable instructions stored on a memory resource (e.g., the memory resource of the network switch of FIG. 7), executable machine readable instructions stored on a storage medium (e.g., the medium of FIG. 8), in the form of electronic circuitry (e.g., on an Application-Specific Integrated Circuit (ASIC)), and/or another suitable form. Although the description of method 100 herein primarily refers to steps performed on a network switch for purposes of illustration, it is appreciated that in some implementations, method 100 can be executed on another computing device within an SDN or in data communication with a network switch.

Method 100 includes accumulating (at block 102) from multiple forwarding tables of a network switch, an action set for a first packet received by the switch, wherein the action set includes a set of actions in a pipeline to be performed on the first packet. For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering the payload data.

For example, control data can include network addresses for source and destination nodes, error detection codes, sequencing information, packet size of the packet, a time-to-live (TTL) value, etc. In contrast, payload data can include data carried on behalf of an application for use by source and destination nodes. It is appreciated that the term "forwarding tables" can, for example, include routing tables, switching tables, and other tables providing forwarding information.

As provided above, instructions can be attached to a flow entry and can describe packet processing to occur when a packet matches the flow entry. As used herein, the term "instruction" can, for example, refer to instructions to: (1) modify pipeline processing, such as directing the packet to another flow table, (2) contain a set of actions to add to the action set, (3) contain a list of actions to apply immediately to the packet, etc. As used herein, the term "action" can, for example, refer to an operation that forwards the packet to a port or modifies the packet, such as decrementing the TTL field. Actions can, for example, be specified as part of the instruction set associated with a flow entry or in an action bucket associated with a group entry. Multiple actions can, for example, be accumulated in the Action Set of the packet or can be applied immediately to the packet. As used herein, the term "action set" can, for example, refer to a set of actions associated with the packet that are accumulated while the packet is processed by each table and that are executed when the instruction set instructs the packet to exit the processing pipeline.

Method 100 includes fetching (at block 104) an action from the action set. Suitable actions can include those provided by the SDN protocol. For example, with respect to the OpenFlow protocol, various actions may be supported, such as Output, Set-Queue, Drop, Group, Push-Tag/Pop-Tag, etc. An output action, can for example be used to forward a packet to a specified physical or virtual port. A set-Queue action can, for example, be used to set a queue identifier (id) for a packet. A drop action can, for example, be used to drop a packet. A group action can, for example, be used to process a packet through a specified group. Push-tag/pop-tag actions can, for example, be used to support the ability to push/pop packet tags. It is appreciated that the above actions are only a few suitable actions for use with the present disclosure and that additional, fewer, and/or alternative actions can be used.

Method 100 includes determining (at block 106), with a networking Application-Specific Integrated Circuit (ASIC) in the network switch, whether the fetched action is to be performed immediately on the first packet. As provided above, this determination can be similar to certain "Apply-Action" actions supported by some SDN protocols, such as OpenFlow. Such actions can, for example, instruct the switch to apply a specific action (or actions) immediately, without any change to the Action Set. Such instructions can, for example, be used to modify the packet between two tables or to execute multiple actions of the same type. The actions can, for example, be specified as an action list. In some circumstances, one example of an action to be performed immediately is an output action, however it is appreciated that other immediate actions may be used with the present disclosure. In one example, a first table can include actions to be accumulated (e.g., increment counter), a second table can include actions to be applied immediately (e.g., modify header, output port 5, and increment counter), and a third table can include actions to be accumulated (change TTL and output port 7).

Method 100 includes generating (at block 108) a second packet from the first packet. Block 108 can, for example, be in response to determining that the fetched action is to be performed immediately. In some implementations, generating a second packet from the first packet can include copying the first packet such that the second packet is an exact replica of the first packet. It is appreciated that in some implementations, the second packet is not an exact replica of the first packet, but is merely generated based on one or more aspects of the first packet. In some implementations, copying of the first packet (or other generation of the second packet) is performed by a replication engine within the ASIC. For example, in some implementations, a replication engine is able to create copies of packets and send them to output ports and/or return the packets for further processing as described below. It is appreciated that in some circumstances the first packet is modified before the second packet is generated. For example, the first packet may have a first action applied to it to modify its header and then a second action can be to output the modified packet out of a specific port. In such a situation, the first packet will be outputted out of the specific port after it is modified by the first action.

Method 100 includes outputting (at block 110) one of the first and second packets through an output port. It is appreciated that the output port can, for example, be in the form of physical, virtual, and/or logical ports. That is, physical ports can, for example, refer to ports that correspond to a hardware interface of the switch. For example, on an Ethernet switch, physical ports map one-to-one to the Ethernet interfaces. In some implementations, a switch may be virtualized over switch hardware. In such an implementation, a physical port may represent a virtual slice of corresponding hardware interface of the switch. Logical ports can, for example, being the form of ports that do not correspond directly to a hardware interface of the switch. Logical ports can, for example, be considered higher level abstractions that may be defined in the switch using methods such as link aggregation groups, tunnels, loopback interfaces, etc.

Method 100 includes returning (at block 112) the other of the first and second packets for further processing. It is appreciated that the returned packet can be either the first packet or the second packet. The further processing can, for example, be performed by a programmable network processor. Such a processor can, for example, communicate with other components of the network switch. For example, in some implementations, the programmable network processor can communicate with a packet replication engine to tell the replication engine how to replicate packets. The network packet processor can, for example, have read access to a series of direct lookup tables, TCAMs, hashes (where the flow tables are stored) and a memory where it can write information and is preserved between different packets.

Although the flowchart of FIG. 1 shows a specific order of performance, it is appreciated that this order may be rearranged into another suitable order, may be executed concurrently or with partial concurrence, or a combination thereof. Likewise, suitable additional and/or comparable steps may be added to method 100 or other methods described herein in order to achieve the same or comparable functionality. In some implementations, one or more steps are omitted. For example, in some implementations, block 112 of returning the other of the first and second packets for further processing can be omitted from method 100. It is appreciated that blocks corresponding to additional or alternative functionality of other implementations described herein can be incorporated in method 100. For example, blocks corresponding to the functionality of various aspects of the network switch of FIG. 7 otherwise described herein can be incorporated in method 100 even if such functionality is not explicitly characterized herein as a block in a method.

Figure 2:
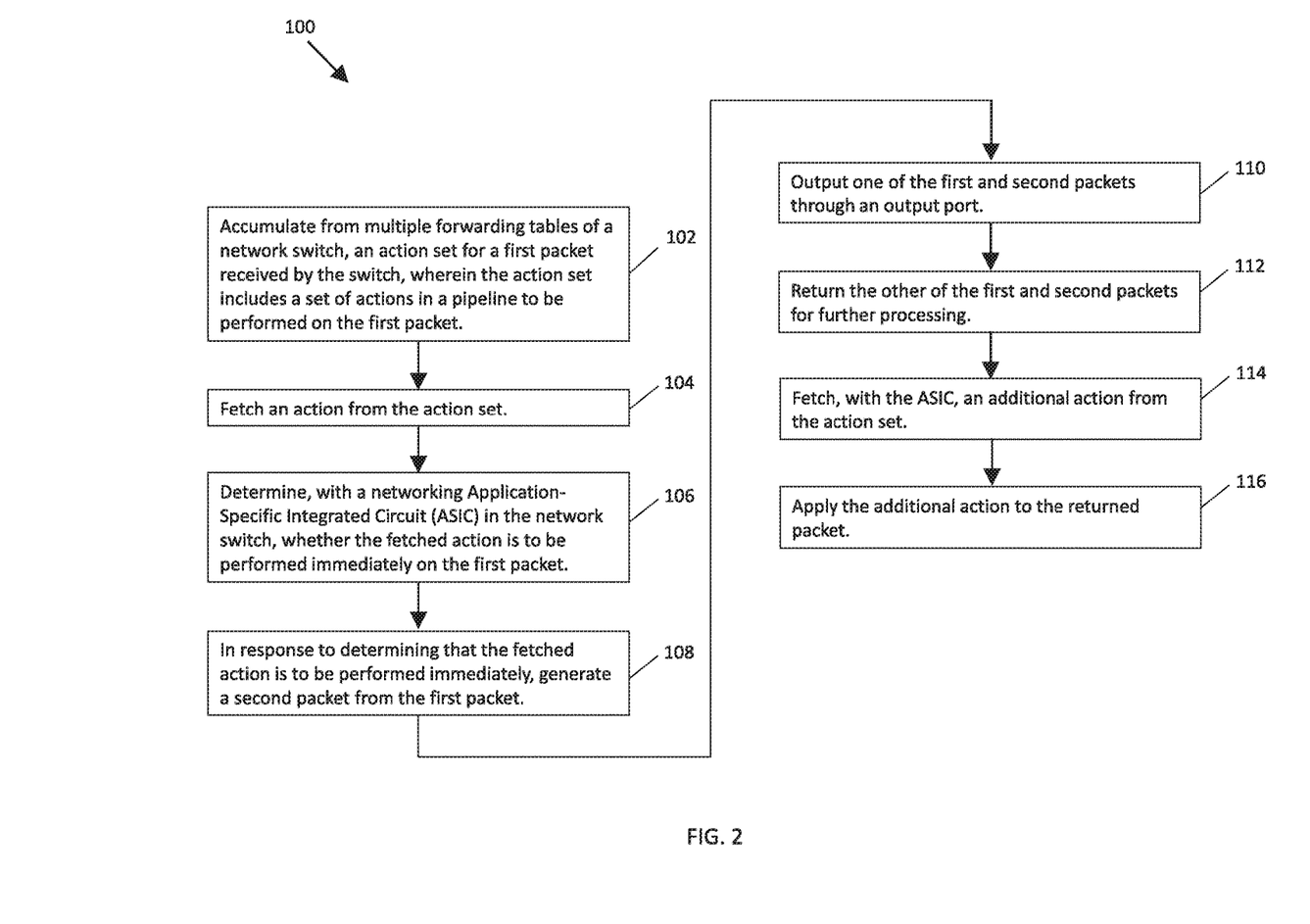
FIG. 2 is a flowchart for a method, according to another example.

FIG. 2 illustrates another example of method 100 in accordance with the present disclosure. For illustration, FIG. 2 reproduces various blocks from method 100 of FIG. 1, however it is appreciated that method 100 of FIG. 2 can include additional, alternative, or fewer steps, functionality, etc., than method 100 of FIG. 1 and is not intended to be limited by the diagram of FIG. 1 (or vice versa) or the related disclosure thereof. It is further appreciated that method 100 of FIG. 1 can incorporate one or more aspects of method 100 of FIG. 2 and vice versa. For example, in some implementations, method 100 of FIG. 1 can include the additional step described below with respect to method 100 of FIG. 2.

Method 100 includes fetching (at block 114), with the ASIC, an additional action from the action set and applying (at block 116) the additional action to the returned packet. Blocks 114 and 116 can, for example, address handling of the returned packet. That is, as provided above, in some circumstances an action set may include additional actions to be performed on the packet following an action to be applied immediately. Blocks 114 and 116 are used to apply these additional actions to the returned packet.

Figure 3:
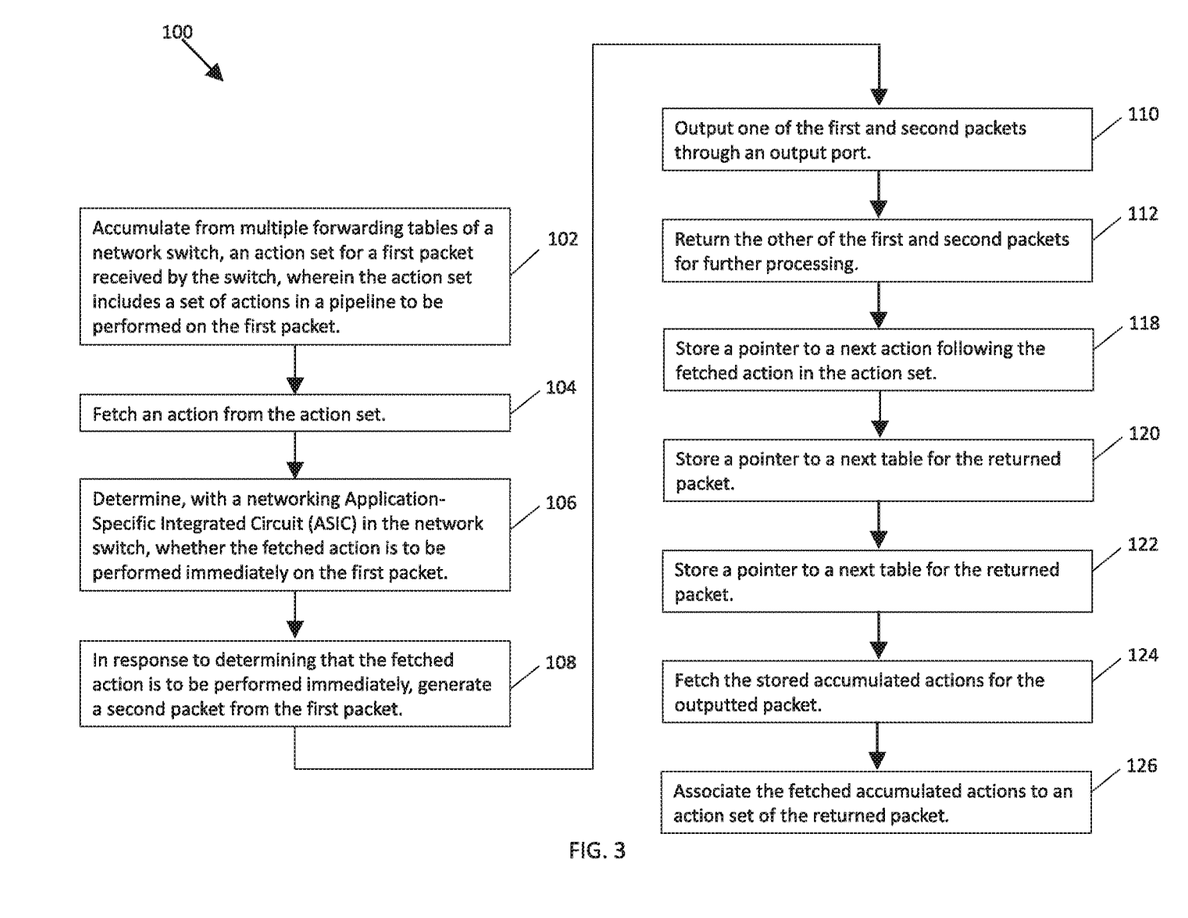
FIG. 3 is a flowchart for a method, according to another example.

FIG. 3 illustrates another example of method 100 in accordance with the present disclosure. For illustration, FIG. 3 reproduces various blocks from method 100 of FIG. 1, however it is appreciated that method 100 of FIG. 3 can include additional, alternative, or fewer steps, functionality, etc., than method 100 of FIG. 1 and is not intended to be limited by the diagram of FIG. 1 (or vice versa) or the related disclosure thereof. It is further appreciated that method 100 of FIG. 1 can incorporate one or more aspects of method 100 of FIG. 3 and vice versa. For example, in some implementations, method 100 of FIG. 1 can include the additional step described below with respect to method 100 of FIG. 3.

Method 100 includes, in response to determining that the action is to be performed immediately, storing (at block 118) a pointer to a next action following the fetched action in the action set, storing (at block 120) a pointer to a next table for the returned packet, and storing (at block 122) accumulated actions for the returned packet. Blocks 118, 120, and 122 can, for example, be used to store information relating to further processing of the returned packet by the network switch.

Method 100 further includes fetching (at block 124) the stored accumulated actions for the outputted packet and associating (at block 126) the fetched accumulated actions to an action set of the returned packet. Blocks 124 and 126 can, for example, be used to administer further processing of the returned packet by the network switch.

Figure 4:
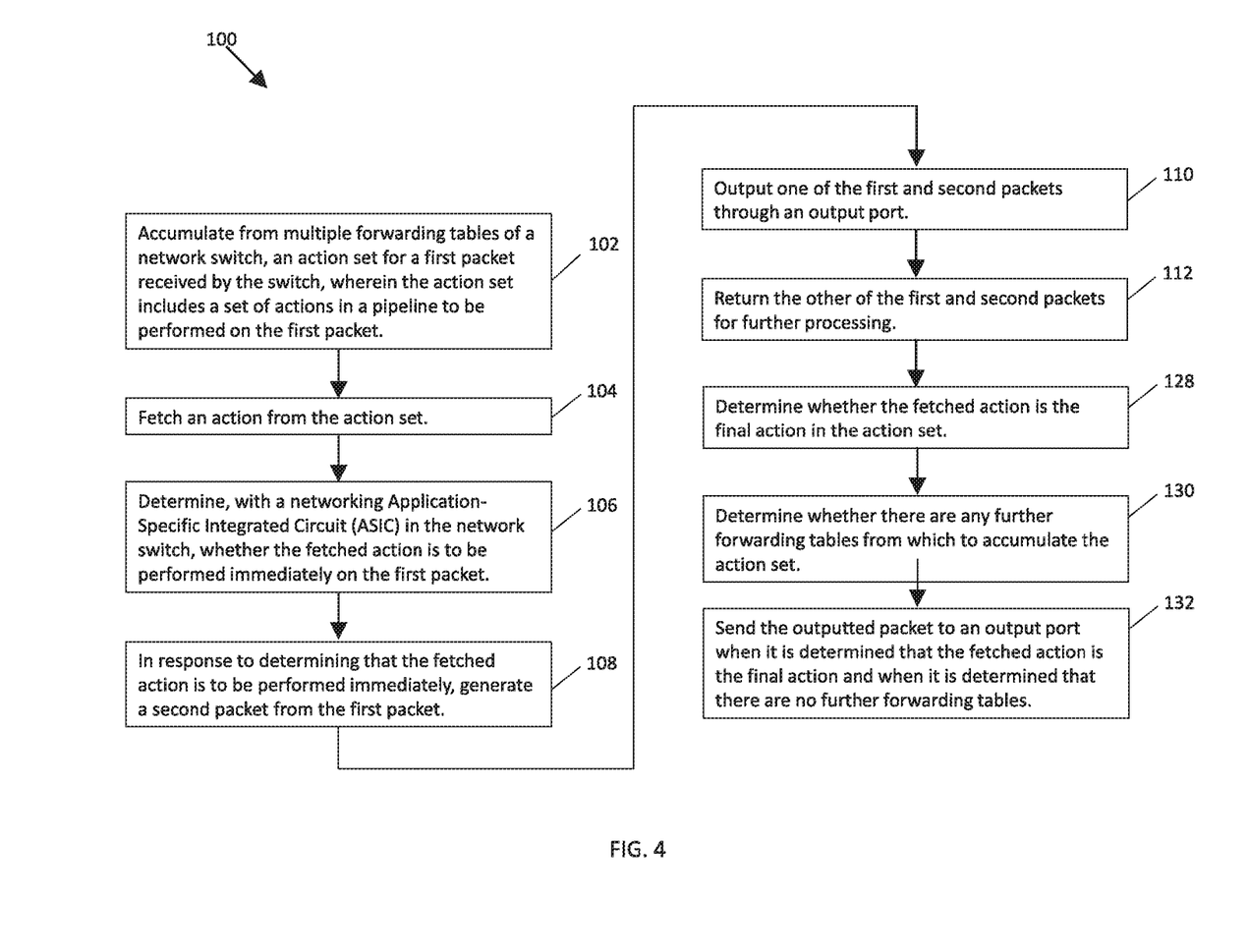
FIG. 4 is a flowchart for a method, according to another example.

FIG. 4 illustrates another example of method 100 in accordance with the present disclosure. For illustration, FIG. 4 reproduces various blocks from method 100 of FIG. 1, however it is appreciated that method 100 of FIG. 4 can include additional, alternative, or fewer steps, functionality, etc., than method 100 of FIG. 1 and is not intended to be limited by the diagram of FIG. 1 (or vice versa) or the related disclosure thereof. It is further appreciated that method 100 of FIG. 1 can incorporate one or more aspects of method 100 of FIG. 4 and vice versa. For example, in some implementations, method 100 of FIG. 1 can include the additional step described below with respect to method 100 of FIG. 4.

Method 100 includes determining (at block 128) whether the fetched action is the final action in the action set, determining (at block 130) whether there are any further forwarding tables from which to accumulate the action set, and sending (at block 132) the outputted packet to an output port when it is determined that the fetched action is the final action and when it is determined that there are no further forwarding tables. Blocks 128, 130, and 132 can, for example, be used to check and handle situations where there are additional actions (or no additional actions) to be applied to the returned packet.

Figure 5:
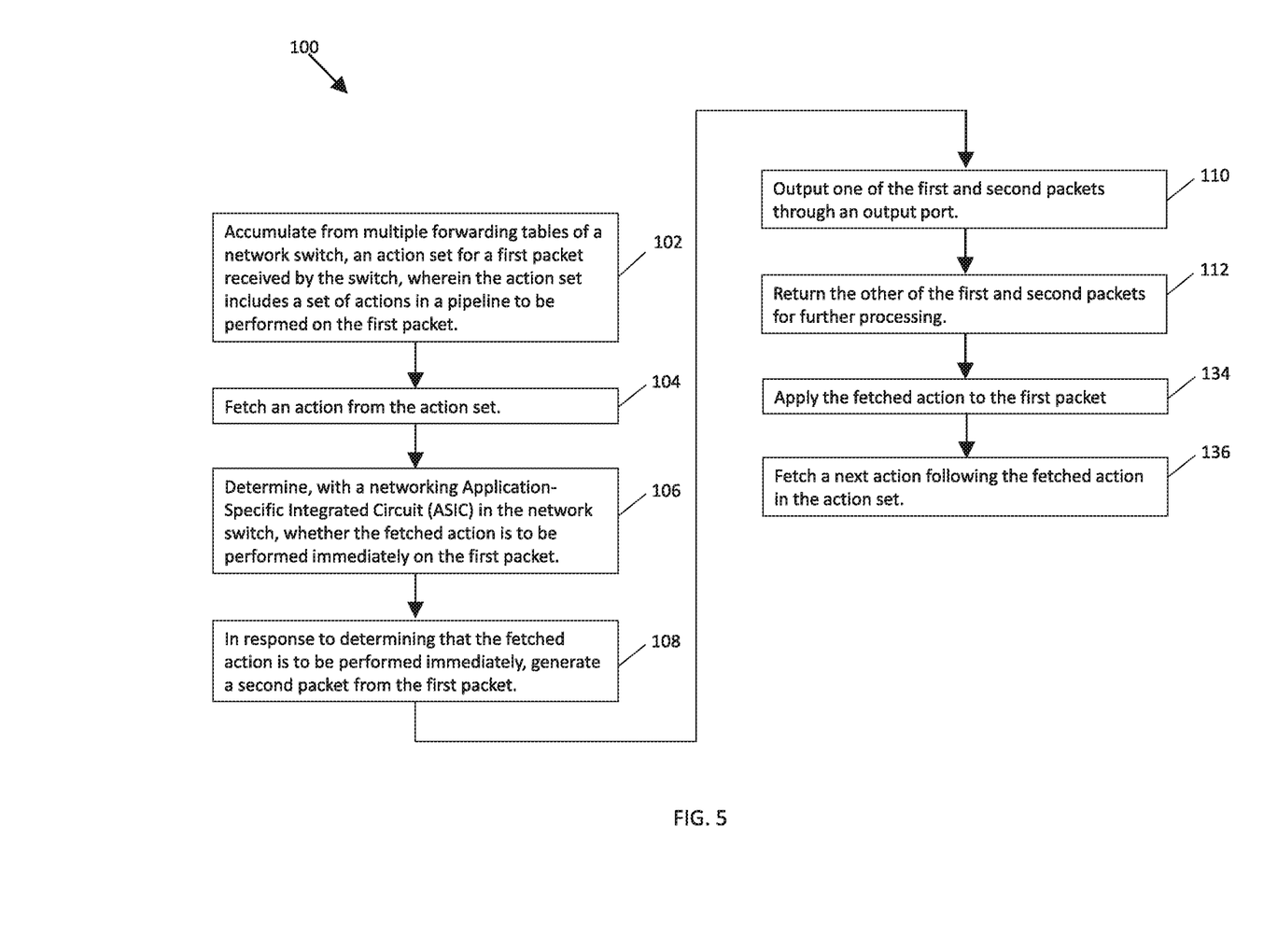
FIG. 5 is a flowchart for a method, according to another example.

FIG. 5 illustrates another example of method 100 in accordance with the present disclosure. For illustration, FIG. 5 reproduces various blocks from method 100 of FIG. 1, however it is appreciated that method 100 of FIG. 5 can include additional, alternative, or fewer steps, functionality, etc., than method 100 of FIG. 1 and is not intended to be limited by the diagram of FIG. 1 (or vice versa) or the related disclosure thereof. It is further appreciated that method 100 of FIG. 1 can incorporate one or more aspects of method 100 of FIG. 5 and vice versa. For example, in some implementations, method 100 of FIG. 1 can include the additional step described below with respect to method 100 of FIG. 5.

Method 100 includes in response to determining that the fetched action is not to be performed immediately, applying (at block 134) the fetched action to the first packet and fetching (at block 136) a next action following the fetched action in the action set. Blocks 134 and 136 can, for example, be used to handle situations in which actions for modifying the packet (e.g., modifying a header of the packet) are provided before actions that are to be immediately applied to the packet are provided (e.g., outputting the packet through an output port) to be applied to the returned packet.

Figure 6:
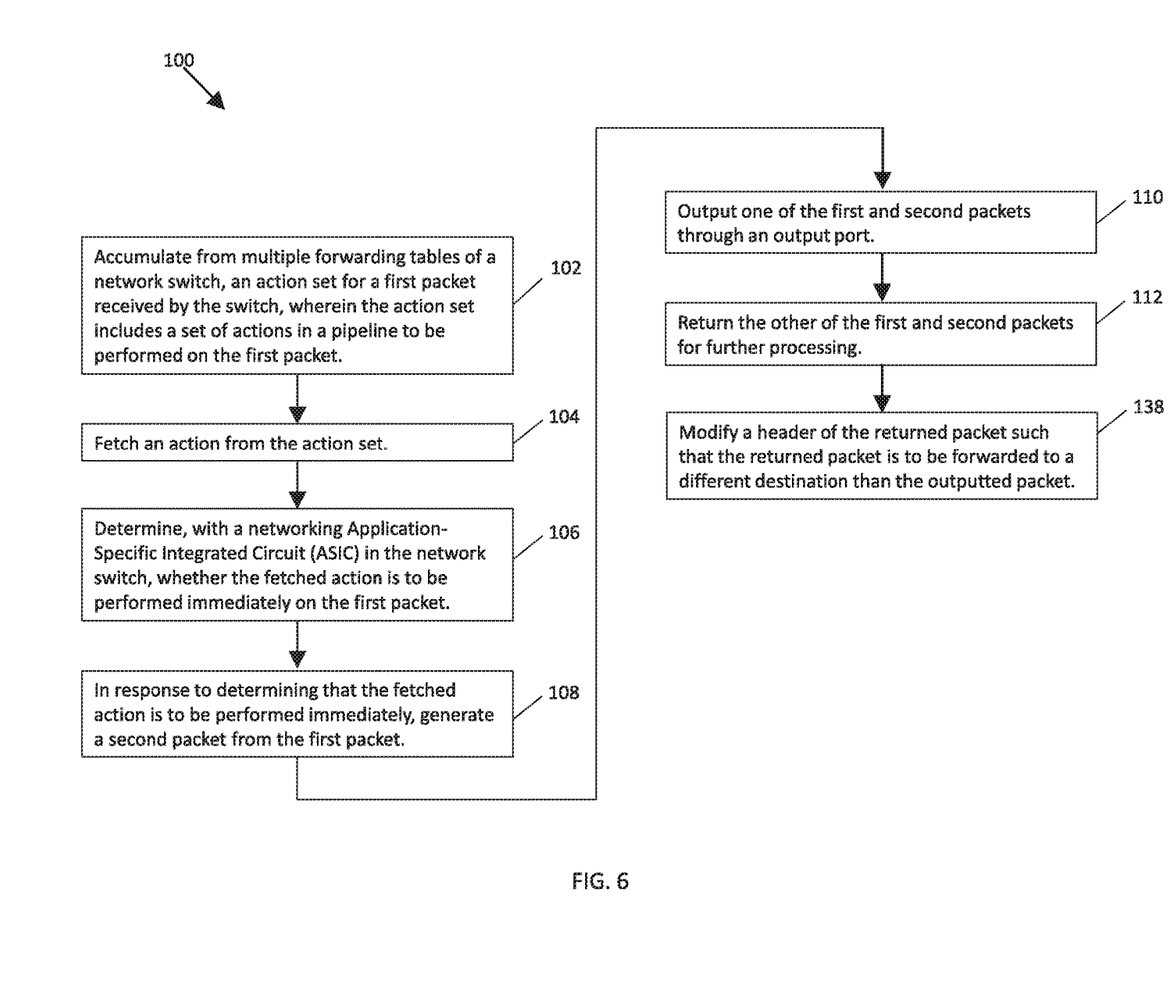
FIG. 6 is a flowchart for a method, according to another example.

FIG. 6 illustrates another example of method 100 in accordance with the present disclosure. For illustration, FIG. 6 reproduces various blocks from method 100 of FIG. 1, however it is appreciated that method 100 of FIG. 6 can include additional, alternative, or fewer steps, functionality, etc., than method 100 of FIG. 1 and is not intended to be limited by the diagram of FIG. 1 (or vice versa) or the related disclosure thereof. It is further appreciated that method 100 of FIG. 1 can incorporate one or more aspects of method 100 of FIG. 6 and vice versa. For example, in some implementations, method 100 of FIG. 1 can include the additional step described below with respect to method 100 of FIG. 6.

Method 100 includes modifying (at block 138) a header of the returned packet such that the returned packet is to be forwarded to a different destination than the outputted packet. Block 138 is provided as an example modification that can be applied to the returned packet. As described above, it is appreciated that any suitable modifications can be made to the packet in accordance with matching flow entries stored on the network switch or otherwise.

Figure 7:
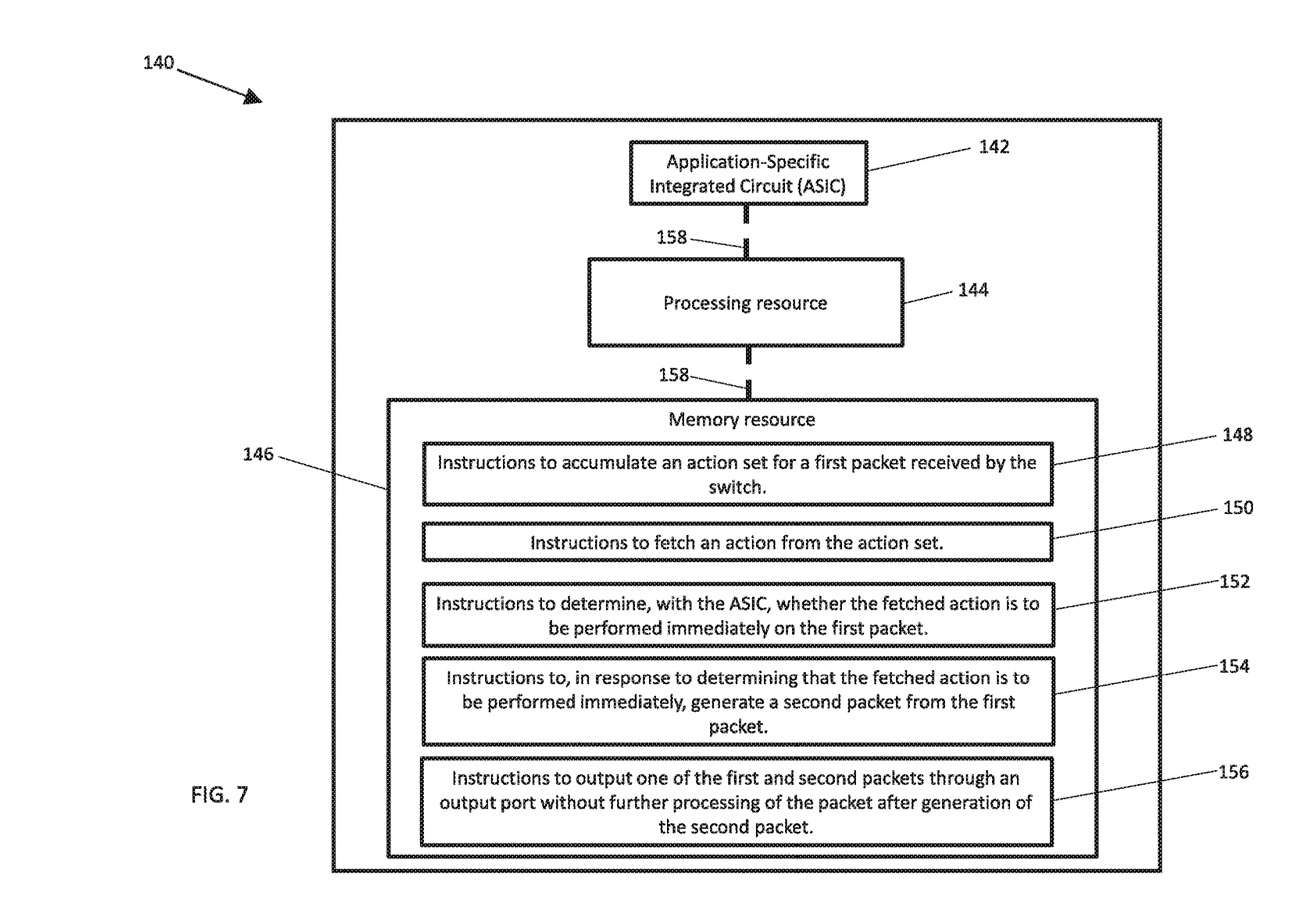
FIG. 7 is a diagram of network switch, according to an example.

FIG. 7 is a diagram of a network switch 140 in accordance with the present disclosure. As described in further detail below, network switch 140 includes an ASIC 142, a processing resource 144, and a memory resource 146 that stores machine-readable instructions 148, 150, 152, 154, and 156. For illustration, the description of network switch 140 of FIG. 7 makes reference to various aspects of method 100 of FIGS. 1-6 (such as the ASIC described above in method 100). However it is appreciated that network switch 140 of FIG. 7 can include additional, alternative, or fewer aspects, functionality, etc., than the implementation described with respect to method 100 and is not intended to be limited by the related disclosure thereof.

ASIC 142 can be designed to allow for efficient and quick network packet processing, rather than general-purpose processing. It is appreciated that the term "ASIC" as used herein can, for example, include related technologies such as application-specific field-programmable gate arrays (FP-GAs), which can, for example contain an array of programmable logic blocks, and a hierarchy of reconfigurable interconnects that allow the blocks to be wired together. Suitable ASICs for use with the present disclosure can, for example, allow for logic blocks to be configured to perform complex combinational functions as well as simple logic gates like AND and XOR.

Suitable ASICs for use with the present disclosure can, for example, also include memory elements, which may be simple flip-flops or more complete blocks of memory.

Instructions 148 stored on memory resource 146 are, when executed by processing resource 144, to cause processing resource 144 to accumulate an action set for a first packet received by the switch. Instructions 148 can incorporate one or more aspects of blocks of method 100 or another suitable aspect of other implementations described herein (and vice versa).

Instructions 150 stored on memory resource 146 are, when executed by processing resource 144, to cause processing resource 144 to fetch an action from the action set. Instructions 150 can incorporate one or more aspects of blocks of method 100 or another suitable aspect of other implementations described herein (and vice versa).

Instructions 152 stored on memory resource 146 are, when executed by processing resource 144, to cause processing resource 144 to determine, with the ASIC, whether the fetched action is to be performed immediately on the first packet.

Instructions 152 can incorporate one or more aspects of blocks of method 100 or another suitable aspect of other implementations described herein (and vice versa).

Instructions 154 stored on memory resource 146 are, when executed by processing resource 144, to cause processing resource 144 to in response to determining that the fetched action is to be performed immediately, generate a second packet from the first packet. Instructions 154 can incorporate one or more aspects of blocks of method 100 or another suitable aspect of other implementations described herein (and vice versa).

Instructions 156 stored on memory resource 146 are, when executed by processing resource 144, to cause processing resource 144 to output one of the first and second packets through an output port without further processing of the packet after generation of the second packet. Instructions 156 can incorporate one or more aspects of blocks of method 100 or another suitable aspect of other implementations described herein (and vice versa).

Processing resource 144 of network switch 140 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 146, or suitable combinations thereof. Processing resource 144 can, for example, include single or multiple cores on a chip, multiple cores across multiple chips, multiple cores across multiple devices, or suitable combinations thereof.

Processing resource 144 can be functional to fetch, decode, and execute instructions as described herein. As an alternative or in addition to retrieving and executing instructions, processing resource 144 can, for example, include at least one integrated circuit (IC), other control logic, other electronic circuits, or suitable combination thereof that include a number of electronic components for performing the functionality of instructions stored on memory resource 146. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 144 can, for example, be implemented across multiple processing units and instructions may be implemented by different processing units in different areas of network switch 140.

Memory resource 146 of network switch 140 can, for example, be in the form of a non-transitory machine-readable storage medium, such as a suitable electronic, magnetic, optical, or other physical storage apparatus to contain or store information such as machine-readable instructions 148, 150, 152, 154, and 156. Such instructions can be operative to perform one or more functions described herein, such as those described herein with respect to method 100 or other methods described herein.

Memory resource 146 can, for example, be housed within the same housing as processing resource 144 for network switch 140, such as within a computing tower case for network switch 140. In some implementations, memory resource 146 and processing resource 144 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 146 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

ASIC 142 and memory resource 146 can be in communication with processing resource 144 via respective communication links 158. Each communication link 158 can be local or remote to a machine (e.g., a computing device) associated with processing resource 144. Examples of a local communication link 158 can include an electronic bus internal to a machine (e.g., a computing device) where memory resource 146 is one of volatile, non-volatile, fixed, and/or removable storage medium in communication with processing resource 144 via the electronic bus.

In some implementations, one or more aspects of network switch 140 can be in the form of functional modules that can, for example, be operative to execute one or more processes of instructions 148, 150, 152, 154, or 154 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of a network switch 140 can, for example, include one or more machine-readable storage mediums and one or more computer processors.

In view of the above, it is appreciated that the various instructions of network switch 140 described above can correspond to separate and/or combined functional modules. For example, instructions 148 can correspond to an "accumulation module" to accumulate an action set for a first packet received by network switch 140; instructions 150 can correspond to a "fetching module" to fetch an action from the action set; instructions 152 can correspond to a "determination module" to determine, with the ASIC, whether the fetched action is to be performed immediately on the first packet; instructions 154 can correspond to a "generation module" to, in response to determining that the fetched action is to be performed immediately, generate a second packet from the first packet; and instructions 156 can correspond to an "output module" to output one of the first and second packets through an output port without further processing of the packet after generation of the second packet. It is further appreciated that a given module can be used for multiple functions. As but one example, in some implementations, a single module can be used to both aggregate an action set (e.g., corresponding to the functionality of instructions 148) as well as to fetch an action from the action set (e.g., corresponding to the functionality of instructions 150).

In some implementations, network switch 140 can further include a suitable communication module to allow networked communication between network switch 140 and an SDN controller and/or other elements of an SDN. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of network switch 140, or other network equipment. The communication module can, for example, include machine-readable instructions for use with communication the communication module, such as firmware for implementing physical or virtual network ports.

Figure 8:
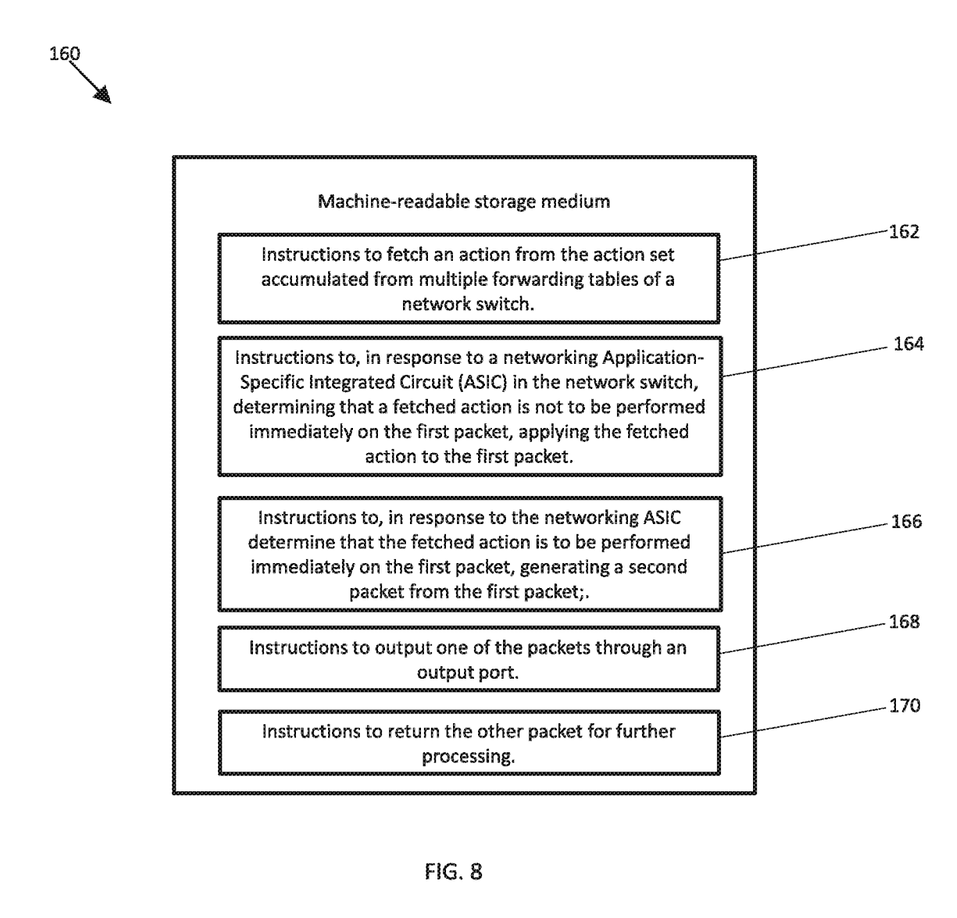
FIG. 8 is a diagram of machine-readable storage medium, according to an example.

FIG. 8 illustrates a machine-readable storage medium 160 including various instructions that can be executed by a computer processor or other processing resource. In some implementations, medium 160 can be housed within a network switch, such as a network switch 140, or on another computing device within a network or in local or remote wired or wireless data communication with a network.

For illustration, the description of machine-readable storage medium 160 provided herein makes reference to various aspects of network switch 140 (e.g., processing resource 144) and other implementations of the disclosure (e.g., method 100).

Although one or more aspects of network switch 140 (as well as instructions such as instructions 148, 150, 152, 154, and 156) can be applied or otherwise incorporated with medium 160, it is appreciated that in some implementations, medium 160 may be stored or housed separately from such a system. For example, in some implementations, medium 160 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 160 includes machine-readable instructions 162 stored thereon to cause processing resource 144 to fetch an action from the action set accumulated from multiple forwarding tables of a network switch. Instructions 162 can, for example, incorporate one or more aspects of block 104 of method 100 or instructions 150 of network switch 140 or another suitable aspect of other implementations described herein (and vice versa).

Medium 160 includes machine-readable instructions 164 stored thereon to cause processing resource 144 to, in response to a networking Application-Specific Integrated Circuit (ASIC) in the network switch, determine that a fetched action is not to be performed immediately on the first packet, applying the fetched action to the first packet. Instructions 164 can, for example, incorporate one or more aspects of block 106 of method 100 or instructions 152 of network switch 140 or another suitable aspect of other implementations described herein (and vice versa).

Medium 160 includes machine-readable instructions 166 stored thereon to cause processing resource 144 to, in response to the networking ASIC determining that the fetched action is to be performed immediately on the first packet, generate a second packet from the first packet. Instructions 166 can, for example, incorporate one or more aspects of block 106 of method 100 or instructions 152 of network switch 140 or another suitable aspect of other implementations described herein (and vice versa).

Medium 160 includes machine-readable instructions 168 stored thereon to cause processing resource 144 to output one of the packets through an output port.

Instructions 168 can, for example, incorporate one or more aspects of block 110 of method 100 or instructions 156 of network switch 140 or another suitable aspect of other implementations described herein (and vice versa).

Medium 160 includes machine-readable instructions 170 stored thereon to cause processing resource 144 to return the other packet for further processing.

Instructions 170 can, for example, incorporate one or more aspects of block 112 of method 100 or instructions of network switch 140 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
accumulating from multiple forwarding tables of a network switch, an action set for a first packet received by the switch, wherein the action set includes a set of actions in a pipeline to be performed on the first packet;
fetching an action from the action set;
determining, by a networking Application-Specific Integrated Circuit (ASIC) in the network switch, whether the fetched action is an output action to be performed immediately on the first packet, wherein the output action specifies a physical or virtual port for outputting the first packet;
in response to determining that the fetched action is an output action to be performed immediately, generating, by the ASIC, a second packet based on the first packet;
outputting one of the first and second packets through the specified physical or virtual port before performing actions remaining in the action set on the outputted packet; and
returning the other one of the first and second packets for further processing, which involves performing the actions remaining in the action set and accumulating actions from additional forwarding tables.

2. The method of claim 1, further comprising:
fetching, with the ASIC, an additional action from the action set; and
applying the additional action to the returned packet.

3. The method of claim 1, further comprising:
in response to determining that the action is an output action to be performed immediately, storing a pointer to a next action following the fetched action in the action set,
in response to determining that the action is an output action to be performed immediately, storing a pointer to a next table for the returned packet; and
in response to determining that the action is an output action to be performed immediately, storing accumulated actions for the returned packet.

4. The method of claim 3, further comprising:
fetching the stored accumulated actions;
associating the fetched accumulated actions to an action set of the returned packet.

5. The method of claim 1, further comprising:
determining whether the fetched action is a final action in the action set;
determining whether there are any further forwarding tables from which to accumulate the action set; and
sending the outputted packet to an output port when it is determined that the fetched action is the final action and when it is determined that there are no further forwarding tables.

6. The method of claim 1, wherein the second packet is copied from the first packet using a replication engine of the ASIC.

7. The method of claim 1, further comprising:
in response to determining that the fetched action is not an output action to be performed immediately, applying, by the ASIC, the fetched action to the first packet; and
in response to determining that the fetched action is not an output action to be performed immediately, fetching a next action following the fetched action in the action set.

8. The method of claim 1, further comprising:
modifying a header of the returned packet such that the returned packet is to be forwarded to a different destination than the outputted packet.

9. The method of claim 1, wherein the first packet is modified before the second packet is generated.

10. The method of claim 1, wherein no modifications are made to the outputted packet before outputting the outputted packet.

11. A non-transitory machine readable storage medium having stored thereon machine readable instructions to cause a computer processor to:
fetch an action from an action set accumulated from multiple forwarding tables of a network switch, wherein the action set includes a set of actions in a pipeline to be performed on a first packet;
in response to a networking Application-Specific Integrated Circuit (ASIC) in the network switch, determining that the fetched action is not an output action to be performed immediately on the first packet, apply the fetched action to the first packet;
in response to the networking ASIC determining that the fetched action is an output action to be performed immediately on the first packet, generate a second packet based on the first packet, wherein the output action specifies a physical or virtual port for outputting the first packet;
output one of the first and second packets through the specified physical or virtual port before performing actions remaining in the action set on the outputted packet; and
return the other one of the first and second packets for further processing, which involves performing the actions remaining in the action set and accumulating actions from additional forwarding tables.

12. The medium of claim 11, wherein the medium is stored on the network switch.

13. A network switch comprising:
an Application-Specific Integrated Circuit (ASIC);
a processing resource; and
a memory resource storing machine readable instructions to cause the processing resource to:
accumulate an action set for a first packet received by the switch;
fetch an action from the action set;
determine, with the ASIC, whether the fetched action is an output action to be performed immediately on the first packet, wherein the output action specifies a physical or virtual port for outputting the first packet;
in response to determining that the fetched action is an output action to be performed immediately, generate, by the ASIC, a second packet based on the first packet;
output one of the first and second packets through the specified physical or virtual port before performing actions remaining in the action set on the outputted packet; and
return the other one of the first and second packets for further processing, which involves performing the actions remaining in the action set and accumulating actions from additional forwarding tables.

14. The network switch of claim 13, wherein the outputted packet is the first packet, and wherein the returned packet is the second packet.

* * * * *